United States Patent
Rede et al.

(10) Patent No.: US 10,876,748 B2
(45) Date of Patent: Dec. 29, 2020

(54) SYSTEM AND METHOD OF A WATER MANAGEMENT FOR AN INDIRECT EVAPORATIVE COOLER

(71) Applicant: SCHNEIDER ELECTRIC IT CORPORATION, West Kingston, RI (US)

(72) Inventors: Jacob Joseph Rede, Dardenne Prairie, MO (US); John H. Bean, Jr., Defiance, MO (US)

(73) Assignee: SCHNEIDER ELECTRIC IT CORPORATION, West Kingston, RI (US)

( * ) Notice: Subject to any disclaimer, the term of this patent is extended or adjusted under 35 U.S.C. 154(b) by 0 days.

(21) Appl. No.: 15/729,984

(22) Filed: Oct. 11, 2017

(65) Prior Publication Data

US 2019/0107332 A1 Apr. 11, 2019

(51) Int. Cl.
*F24F 5/00* (2006.01)
*F24F 6/14* (2006.01)
(Continued)

(52) U.S. Cl.
CPC .............. *F24F 5/0035* (2013.01); *F24F 6/14* (2013.01); *F28F 25/04* (2013.01); *F28F 25/06* (2013.01);
(Continued)

(58) Field of Classification Search
CPC ...... F28D 5/02; F28D 2021/031; F28F 25/04; F28F 25/06; F24F 2001/0085;
(Continued)

(56) References Cited

U.S. PATENT DOCUMENTS 2,088,381 A * 7/1937 Miller ...................... F25B 1/06
62/169
2,228,031 A * 1/1941 Harsch ..................... B05B 1/044
239/598
(Continued)

FOREIGN PATENT DOCUMENTS

JP 2007024478 A * 2/2007
WO 2013039329 A2 3/2013

OTHER PUBLICATIONS

Extended European Search Report from corresponding European Application No. 18198971.6 dated Apr. 18, 2019.

*Primary Examiner* — Eric S Ruppert
*Assistant Examiner* — Hans R Weiland
(74) *Attorney, Agent, or Firm* — Lando & Anastasi, LLP

(57) ABSTRACT

An indirect evaporative cooling system includes a frame, a heat exchanger core, a supply fan to move indoor return air inside the heat exchanger core, an exhaust fan to move air over the heat exchanger core in a direction perpendicular to the indoor return air, a water collection and management system disposed within the frame below the heat exchanger core to collect water sprayed onto the heat exchanger core, and a water spray system positioned above the heat exchanger core to supply water that is evenly distributed to a top surface of the heat exchanger core. The water spray system includes at least one water spray assembly having an enclosure with a surface, and at least two spray nozzles configured to spray water on a portion of the top surface of the heat exchanger core. Each spray nozzle is configured to produce a flat, fan-shaped spray pattern.

16 Claims, 8 Drawing Sheets

(51) Int. Cl.
*F24F 6/00* (2006.01)
*F28F 25/04* (2006.01)
*F28F 25/06* (2006.01)
*F28D 21/00* (2006.01)

(52) U.S. Cl.
CPC .................. *F24F 2006/008* (2013.01); *F28D 2021/0031* (2013.01)

(58) Field of Classification Search
CPC .... F24F 2001/0092; F24F 5/0035; F24F 6/14; F24F 2006/146; H05K 7/20345; H05K 7/20745; H05K 7/20827; B01F 3/04021; B01F 3/04049; B01F 3/04056
See application file for complete search history.

(56) References Cited

U.S. PATENT DOCUMENTS

| | | | |
|---|---|---|---|
| 2,504,710 A * | 4/1950 | Ludman | F25B 39/02 122/382 |
| 4,058,262 A * | 11/1977 | Burnham | B05B 1/202 239/545 |
| 4,112,027 A | 9/1978 | Cates | |
| 5,180,103 A * | 1/1993 | Harrison, Jr. | F28F 25/06 239/1 |
| 5,787,722 A * | 8/1998 | Jenkins | F28D 5/02 165/162 |
| 9,072,201 B2 * | 6/2015 | Bean, Jr. | H05K 7/20745 |
| 9,835,379 B2 * | 12/2017 | Daley | F28F 25/02 |
| 2005/0056042 A1 | 3/2005 | Bourne et al. | |
| 2007/0101746 A1 | 5/2007 | Schlom et al. | |
| 2009/0188650 A1 * | 7/2009 | Morgan | F28D 5/02 165/104.21 |
| 2012/0167610 A1 * | 7/2012 | Dunnavant | H05K 7/20745 62/314 |
| 2014/0262163 A1 * | 9/2014 | Deschamps | F28D 5/02 165/109.1 |
| 2015/0034270 A1 * | 2/2015 | Kim | H05K 7/20745 165/11.1 |
| 2017/0284742 A1 | 10/2017 | Aaron et al. | |

* cited by examiner

SYSTEM AND METHOD OF A WATER MANAGEMENT FOR AN INDIRECT EVAPORATIVE COOLER

BACKGROUND OF DISCLOSURE

1. Field of Disclosure

The present disclosure relates generally to indirect evaporator cooler systems, and more particularly to a water management system for an indirect evaporative cooler configured to spray water on a heat exchanger of the evaporative cooler and to collect water from the evaporative cooler.

2. Discussion of Related Art

Indirect air evaporative cooling systems typically use outdoor air to indirectly cool data center air when the outside temperature is lower than the temperature set point of the IT inlet air, which can result in significant energy savings. Such systems use fans to blow cold outside air across an air-to-air heat exchanger, which in turn cools the hot data center air on the inside of the heat exchanger, thereby completely isolating the data center air from the outside air. This heat removal method normally uses an evaporative assist, in which the outside of the air-to-air heat exchanger is sprayed with water, which allows the heat exchanger to continue its cooling operation for higher ambient temperatures or to provide a more economical cooling operation of the hot data center air. Indirect air evaporative cooling systems can provide cooling capacities up to about 1,000 kilowatts (kW). Some units are roughly the size of a shipping container or larger. These systems mount either on a building roof or along a perimeter of the building.

Using fresh air directly to cool a data center is often viewed as the most efficient cooling approach. For data centers experiencing a wide range of temperature and humidity conditions, this cooling approach is often the most efficient. However, the majority of data center managers are risk-averse to these higher operating temperatures and rapid changes in temperature and humidity. Nor do they wish to expose the data center to pollution or other contaminants that may be present in the direct air cooling process. With rising densities and the adoption of containment practices, it is undesirable to allow IT equipment to run at higher temperatures, especially if a failure event occurs. When temperature and humidity thresholds are kept within industry-recommended limits, indirect air economizers actually provide greater efficiency than direct fresh air.

One approach to cooling large spaces, such as data centers, is to utilize extremely large air-to-air heat exchanger units (AHUs) mounted to one or more external building faces or to the roof. Modern AHUs contain extremely large heat exchangers, such as ten feet long, seven feet wide and seven feet high, containing almost 2,000 heat exchanger tubes. With modern indirect evaporative cooling systems, hot IT air is pulled into an AHU, and one of two modes of economizer operation is used to eject the heat. Based on the load, the IT set point, and outdoor environmental conditions, the system automatically selects the most efficient mode of operation. The indirect air-to-air economization mode uses an air-to-air heat exchanger to transfer the heat energy from the hotter data center air to the colder outdoor air. When evaporative cooling is used, a thin water film is applied over the heat exchanging surfaces of the heat exchanger typically with a water spray system. By spraying water on the heat exchanger, the water can absorb the heat within the heat exchanger and evaporate it to the outdoor air adding moisture to the airstream. This mode of operation allows the data center to continue to benefit from economizer mode operation, even when the air-to-air heat exchanging process alone is unable to reject the data center heat load. Methods and systems for improving cooling efficiency in an indirect evaporative cooling system within a data center or other heat generating process are being explored.

SUMMARY OF DISCLOSURE

One aspect of the present disclosure is directed to an indirect evaporative cooling system. In one embodiment, the system comprises a frame, a heat exchanger core disposed within the frame, a supply fan supported by the frame to move indoor return air inside the heat exchanger core, an exhaust fan supported by the frame to move air over the heat exchanger core in a direction perpendicular to the indoor return air, a water collection and management system disposed within the frame below the heat exchanger core to collect water sprayed onto the heat exchanger core, and a water spray system positioned above the heat exchanger core to supply water that is evenly distributed to a top surface of the heat exchanger core. The water spray system includes at least one water spray assembly having an enclosure having a surface, and at least two spray nozzles coupled to the enclosure and configured to spray water on a portion of the top surface of the heat exchanger core. Each spray nozzle is coupled to a water source and configured to produce a flat, fan-shaped spray pattern.

Embodiments of the system further may include configuring the enclosure to have two end walls, two side walls, and at least one drift eliminator that defines an upper extremity of the enclosure. The at least one drift eliminator may be configured to capture water droplets and to prevent water from escaping the enclosure. The surface may be divided into a plurality of quadrants. For each quadrant, the at least two spray nozzles may include two spray nozzles to provide nearly total coverage on the quadrant. For each quadrant, the two spray nozzles may be positioned on opposite corners of the quadrant to intersect at adjacent edges of spray patterns. For each quadrant, a placement of a first spray nozzle may be located near one point of a first triangular area and directed to spray water to the first triangular area, and a second spray nozzle may be located at an opposite point of a second triangular area that is adjacent the first triangular area and directed to spray water to the second triangular area. Each spray nozzle may be fluidly coupled to the water supply by a piping section to deliver water into and transport water around an interior of the enclosure.

Each spray nozzle may produce a V-shaped spray pattern. Each spray nozzle may be configured to produce a spray pattern with spray angles at 30° to 60° at low pressures.

Another aspect of the disclosure is directed to a method of cooling IT air with an indirect evaporative cooling system. In one embodiment, the method comprises: supplying indoor return air to a heat exchanger core; moving air over the heat exchanger core in a direction perpendicular to the indoor return air; spraying water over the heat exchanger core; and collecting water sprayed onto the heat exchanger core. Spraying water over the heat exchanger core includes spraying water on a top surface of the heat exchanger core with at least two spray nozzles configured to spray water on a portion of the top surface of the heat exchanger core. Each spray nozzle is coupled to a water source and configured to produce a flat, fan-shaped spray pattern.

Embodiments of the method further may include configuring the enclosure to have two end walls, two side walls, and at least one drift eliminator that defines an upper extremity of the enclosure. The at least one drift eliminator may be configured to capture water droplets and to prevent water from escaping the enclosure. The surface may be divided into a plurality of quadrants. For each quadrant, the at least two spray nozzles may include two spray nozzles to provide nearly total coverage on the quadrant. For each quadrant, the two spray nozzles may be positioned on opposite corners of the quadrant to intersect at adjacent edges of spray patterns. For each quadrant, a placement of a first spray nozzle may be located near one point of a first triangular area and directed to spray water to the first triangular area, and a second spray nozzle may be located at an opposite point of a second triangular area that is adjacent the first triangular area and directed to spray water to the second triangular area. Each spray nozzle may be fluidly coupled to the water supply by a piping section. The method further may include controlling the at least two spray nozzles with a controller. Each spray nozzle may be configured to produce a spray pattern with spray angles at 30° to 60° at low pressures.

BRIEF DESCRIPTION OF DRAWINGS

The accompanying drawings are not intended to be drawn to scale. In the drawings, each identical or nearly identical component that is illustrated in various figures is represented by a like numeral. For purposes of clarity, not every component may be labeled in every drawing. In the drawings.

DETAILED DESCRIPTION

Figure 1:
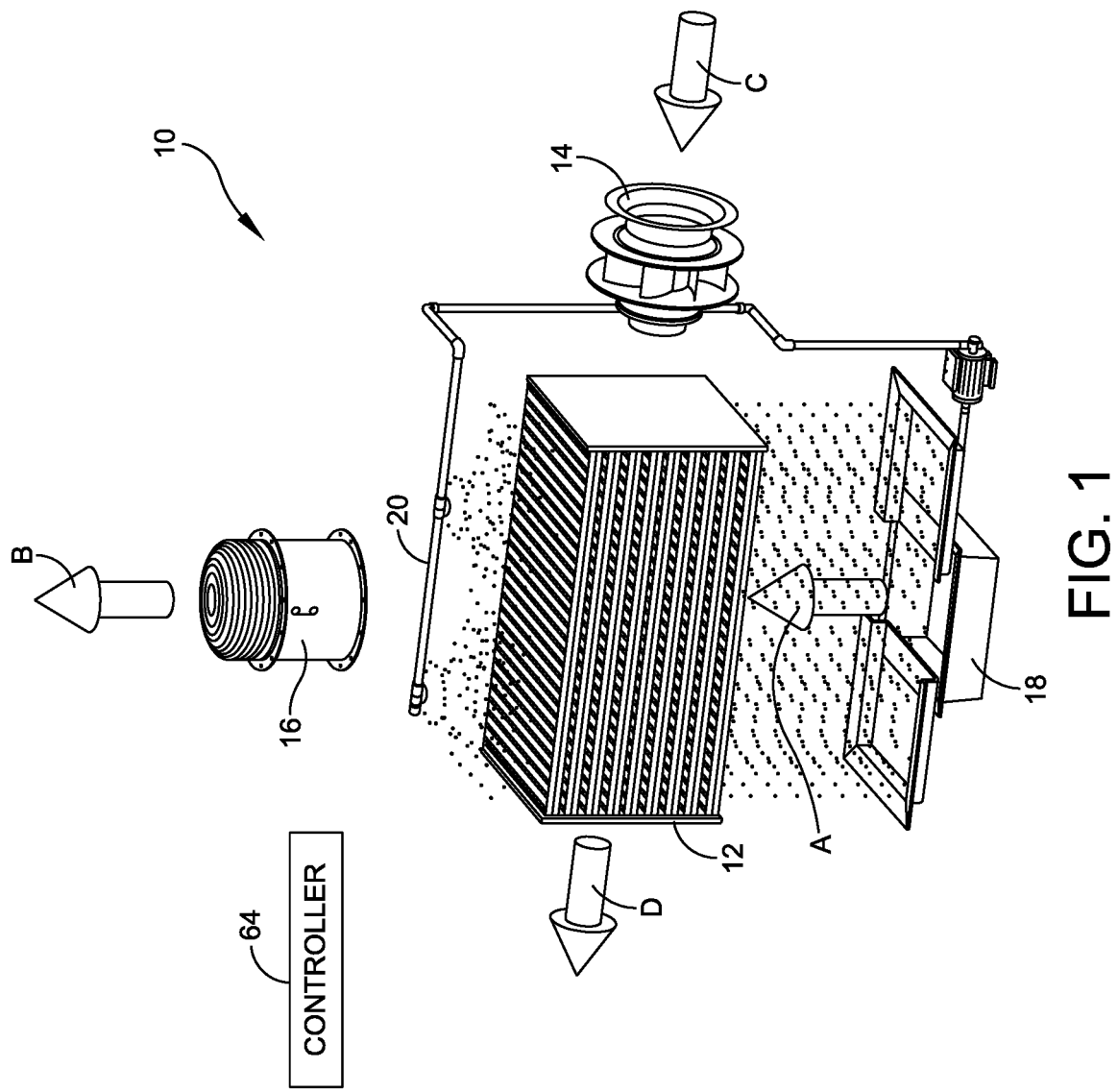
FIG. 1 is an exploded perspective view of an air-to-air heat exchanger using the evaporative process within an operational environment.

This disclosure is not limited in its application to the details of construction and the arrangement of components set forth in the following description or illustrated in the drawings. The principles set forth in this disclosure are capable of being provided in other embodiments and of being practiced or of being carried out in various ways. Also, the phraseology and terminology used herein is for the purpose of description and should not be regarded as limiting. The use of "including," "comprising," "having," "containing," "involving," and variations thereof herein, is meant to encompass the items listed thereafter and equivalents thereof as well as additional items. When specific dimensions, quantities or magnitudes are provided they should be considered in reference to the specific embodiment referenced as they may be scaled to suit other embodiments.

Embodiments of the present disclosure are directed to systems and methods of delivering and recovering evaporative cooling water to a heat exchanger in a uniform and efficient manner Many alternative cooling approaches have been developed and adopted over the last few years in an effort provide efficient heat removal from a variety of processes that generate heat, data centers being one example of these processes. One such method that has gained recent favor is indirect evaporative cooling. This method minimizes/eliminates the need for energy intensive mechanical refrigeration. Some challenges of the indirect evaporative cooling process are fabrication of the evaporative cooling cell, delivering a medium, such as water, to the cooling cell, and processing this water with its associated water collection and management system. Current state of the art uses a high number of piece parts and significant assembly labor. The present disclosure is directed to a water spray system and a water collection and management system, which together form a water management system of an indirect evaporative cooling unit.

Referring to FIG. 1, a typical indirect evaporative cooling system, generally indicated at 10, includes a heat exchanger core 12, a supply fan 14 to move indoor return air (from a building, data center or other heat-generating process) inside the heat exchanger core and an outdoor exhaust fan 16 to draw outdoor air over the heat exchanger core in a direction perpendicular to the indoor building return air. In one embodiment, the supply fan 14 pushes indoor air into the heat exchanger core 12 and the exhaust fan 16 discharges scavenged outdoor air to the ambient environment through the heat exchanger core. As air passes through the heat exchanger core 12, heat is transferred from the indoor air to the outdoor air.

The heat exchanger core 12 of the cooling system 10 illustrated in FIG. 1 is shown apart from a support frame structure. As shown, relatively cool outdoor intake air is directed to a bottom of the heat exchanger core 12 by an intake air plenum or path that exists above a water collection and management system 18 as indicated by arrow A. The outdoor intake air travels through the heat exchanger core 12, and is exhausted by the outdoor exhaust fan 16 which are normally disposed above but could, in some embodiments, be positioned below the heat exchanger core as indicated by arrow B. The heat exchanger core 12 is configured to remove heat from the indoor IT air directed to the heat exchanger core by the supply fan 14 positioned at a near end of the heat exchanger core as indicated by arrow C. The supply fan 14 could also be positioned at the opposite end of the core, near arrow D such that indoor IT air draws through the core instead of pushing air through the core.

As these two airflows progress through the heat exchanger core 12, separated by the walls of the heat exchanger, the warmer IT air represented by arrows C and D transfers heat to the scavenged ambient air represented by arrows A and B. This typical, air-to-air heat exchanging process is of course, not always available for use. In one embodiment, the air-to-air heat exchanging process relies on the ambient air (represented by arrow A) to be at a lower temperature than the indoor or process air (represented by arrow C). However, if the ambient air is at a higher temperature than the process air, and a dry-bulb temperature of the ambient air is not cooler than the process air, then an evaporative cooling process can be utilized instead. During the evaporative cooling process, a thin film of water is applied to the heat exchanging surface of the heat exchanger core 12 that separates the process and scavenger air streams on the external side of the surface. The heat from the process air is transferred via convection and the conduction processes through the wall and into this water film. From this point, the additional heat added to the water initiates a diffusion process from a surface of the water driving the addition of moisture to the scavenged air. This vaporization, or change of state from a liquid to gaseous form of water, can consume vast amounts of heat in a compact area. It can be seen then, that the effective wetting of the heat exchanger surfaces of the heat exchanger core 12 is critical to this process and must be maintained throughout the entire heat exchanger. After the indoor IT air travels through the heat exchanger core 12, the now cooler indoor air is supplied back to the main building, data center or other heat-generating process at the other end of the heat exchanger core as indicated by arrow D.

In one embodiment, the cooling system 10 includes a water spray system 20 positioned above the heat exchanger core 12 to spray water over the heat exchanger core. A water collection and management system 18 is positioned below the heat exchanger core 12 of the heat exchanger to collect and recycle the water that is sprayed over the heat exchanger core by the water spray system 20. During operation, water is sprayed on the heat exchanger core 12 of the cooling system 10 by the water spray system 20 to provide water for the evaporative process to occur in the heat exchanger core. The water that is sprayed on the heat exchanger core 12 of the cooling system 10 is normally supplied to the heat exchanger core at a rate that will ensure the full wetting of the heat exchanging core and routinely exceeds an amount of water that is evaporated from the heat exchanger core during a single cycle of water through the water spray system. The excess water assists in carrying any dissolved solids or captured physical debris back to a water basin of the water collection and management system 18 that is positioned below the heat exchanger core 12. The water basin of the water collection and management system 18, which is configured to filter out debris from the water supply efficiently prior to being re-circulated or redistributed back the water spray system 20 by a pump.

Figure 2:
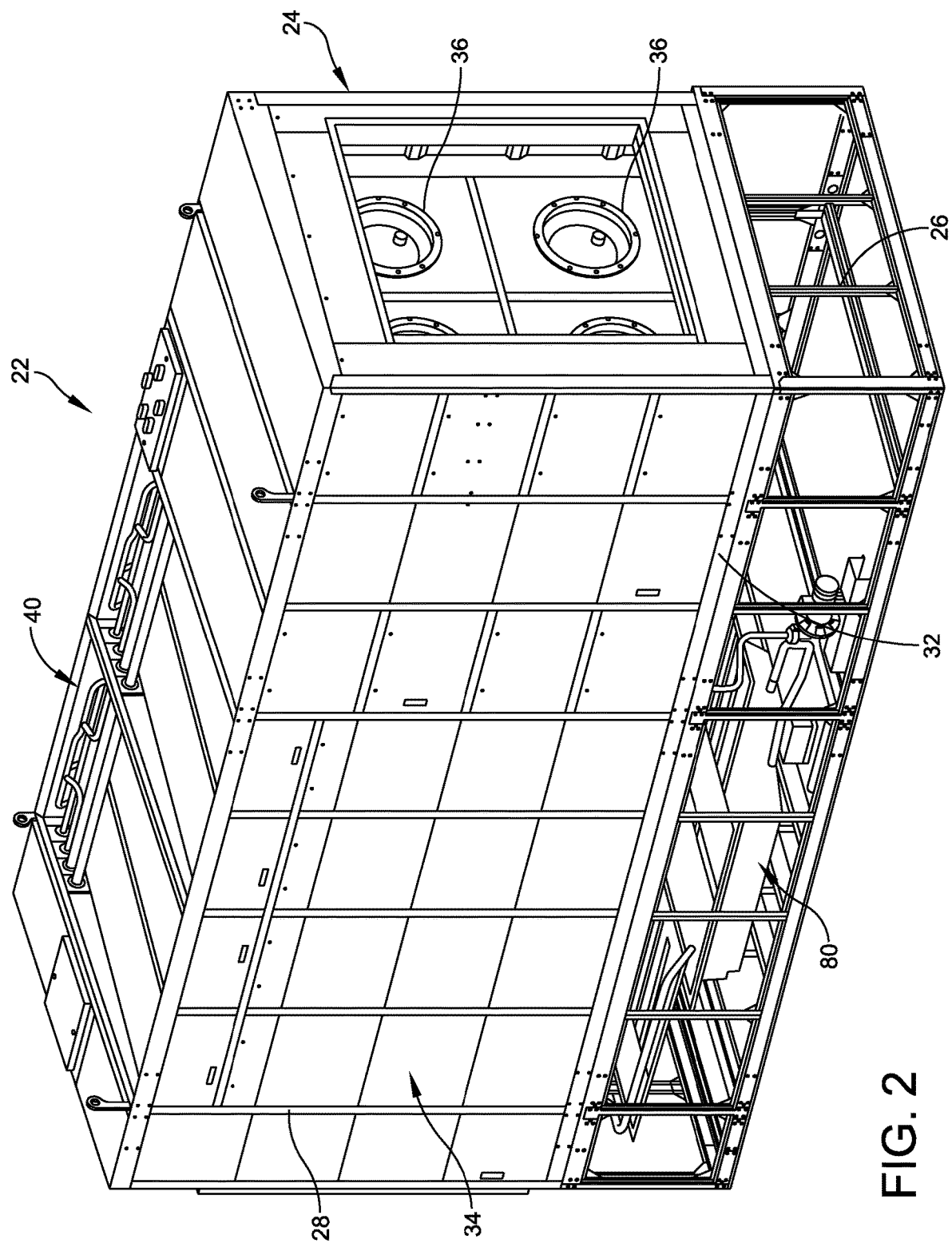
FIG. 2 is a perspective view of an indirect evaporative cooling unit of an embodiment of the present disclosure.
Figure 3:
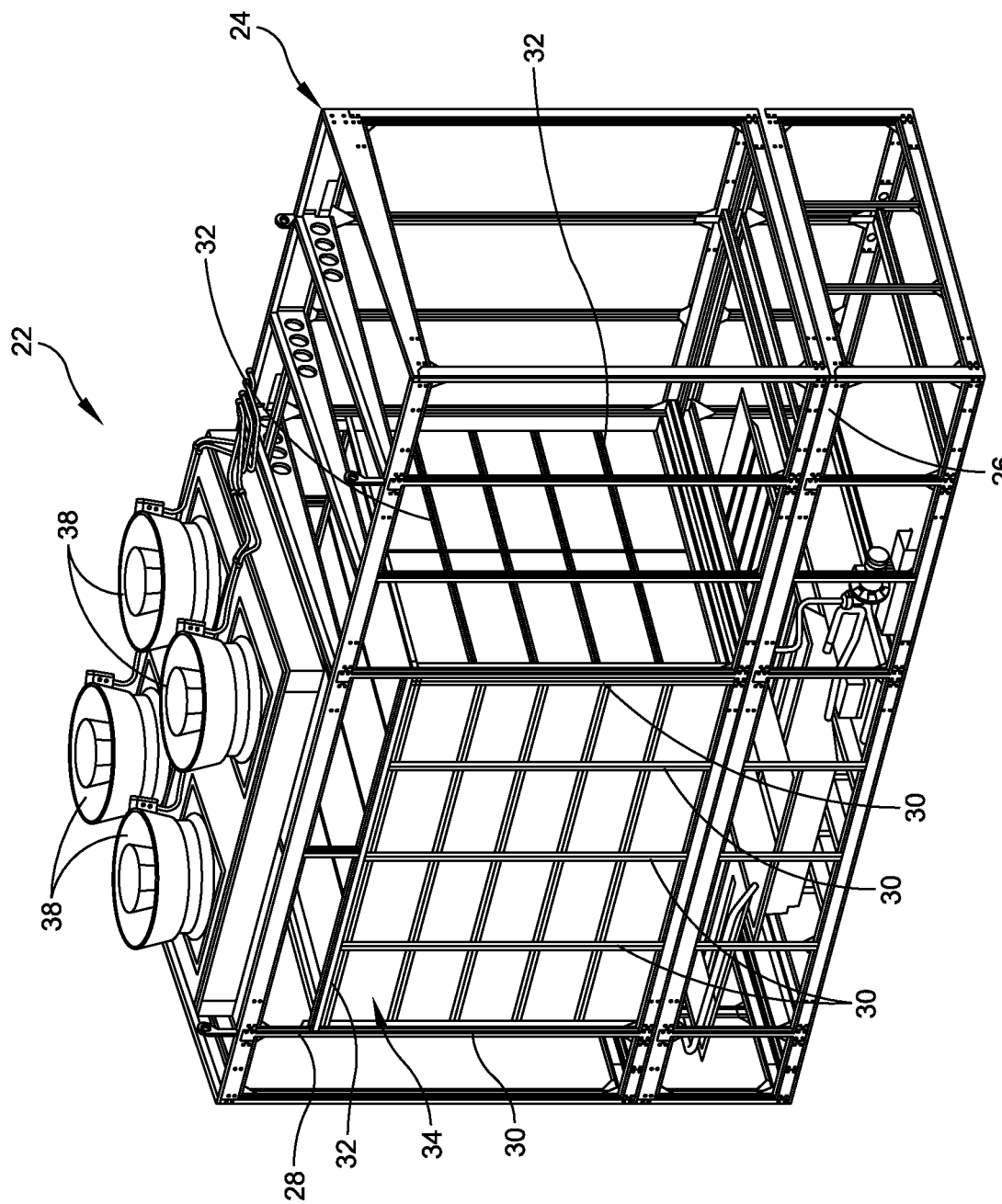
FIG. 3 is a perspective view of the indirect evaporative cooling unit with its outer casing removed to reveal modular heat exchanger elements embodying a heat exchanger core.

Referring to FIGS. 2 and 3, embodiments of the present disclosure are directed to an indirect evaporative cooling ("IEC") unit, generally indicated at 22, which includes an air-to-air heat exchanger that also can be utilized in an evaporative cooling mode. As shown, the IEC unit 22 includes a frame assembly, generally indicated at 24, having a base frame section 26, which, in one embodiment, may be secured to a suitable horizontal surface, such as a concrete pad adjacent a building or on a roof of a building. The frame assembly 24 further includes a core support frame section 28 having a plurality of structural vertical posts, each indicated at 30, and horizontal shelf rails, each indicated at 32 that are configured to support a heat exchanger core, generally indicated at 34, of the IEC unit 22, which provides cooling in the manner described below. The core support frame section 28 further includes a several, e.g., three, intermediate posts 30, which are removable to allow access and service to the heat exchanger core as necessary. The number of posts 30 and shelf rails 32 can be varied and configured to accommodate any number of heat exchanger cores 34 depending on the cooling requirements of the IEC unit 22.

As shown in FIG. 2, fans, each indicated at 36, can be provided at one end of the IEC unit 22 to promote the movement of air horizontally through the heat exchanger core 34. The fans 36 could also be positioned at the opposite end of the IEC unit 22 such that indoor IT air is drawn through the IEC unit instead of being pushed through the IEC unit. As shown in FIG. 3, additional fans, each indicated at 38, can be provided on top of the IEC unit 22 to promote the movement of air vertically through the heat exchanger core 34. After the indoor IT air travels through the heat exchanger core 34 of the IEC unit 22, the cooler indoor air is supplied back to the process air at the other end of the IEC unit. Separately, relatively cool outdoor intake air is directed to a bottom of the IEC unit 22, travels through the heat exchanger core 34, and is expelled by the fans 38 positioned above the heat exchanger core back to the ambient environment.

Water Spray System

In one embodiment of the present disclosure, a water spray system of an indirect evaporative cooling unit is configured to apply (spray) water to a rectangular or square pattern area, thereby reducing waste run-off of water. The water spray system is further configured to spray water in an even and disperse manner, thus maximizing the operation of the heat exchanger within the evaporative cooling unit. The water spray system further requires significantly less vertical height for the dispersion of the water to a heat exchanger while handling entrained debris within the water and meeting lower power pump requirements associated with the system.

Referring to back to FIG. 2, the IEC unit 22 further includes a water spray assembly, generally indicated at 40, which is positioned above the heat exchanger core 34 within the IEC unit and below the outdoor fans 38 shown in FIG. 3. As will be described in greater detail below, the water spray assembly 40 is supported by the core support frame section 28 of the frame assembly 24. In the shown embodiment, a single water spray assembly 40 is provided to spray cool water on the heat exchanger core 34 positioned below. However, any number of water spray assemblies 40 may be provided depending on the size of the heat exchanger core 34 and the particular application. The water spray assembly 40 is configured to evenly distribute water to the top of the heat exchanger core 34.

Figure 4:
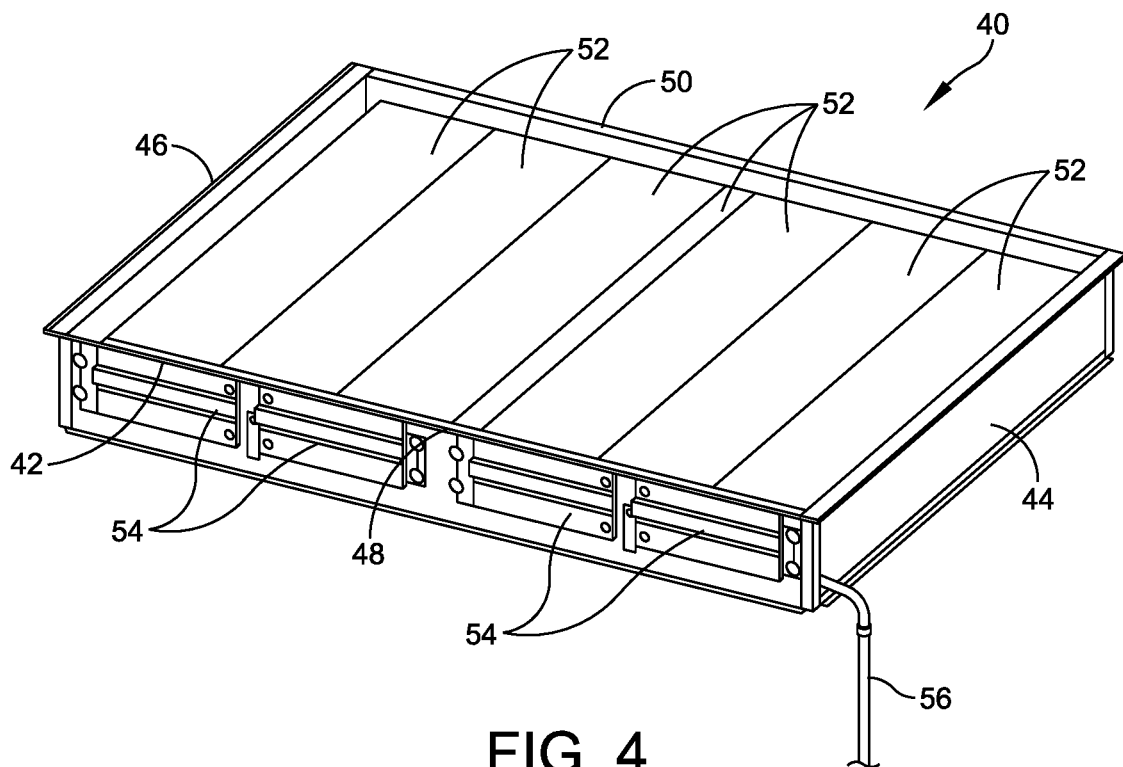
FIG. 4 is a perspective view of a water spray assembly.

Referring to FIG. 4, the water spray assembly 40 includes an enclosure 42 having two end panels 44, 46 and two side panels 48, 50, which together define end walls and side walls of the enclosure. Although the enclosure 42 is shown to be rectangular in the drawings, the enclosure can be square. The enclosure 42 further includes several drift eliminators, each indicated at 52, positioned near the top edges of the end panels 44, 46 and the side panels 48, 50 to define an upper extremity of the wetted area inside the enclosure. The drift eliminators 52 are designed to capture water droplets and mist from an airstream and prevent this liquid from escaping the enclosure 42. As shown, the side panel 48 includes several doors, each indicated at 54, to provide access into the interior of the enclosure 42. The lower edges of the end panels 44, 46 and the side panels 48, 50 define a lower horizontal plane of the enclosure 42 that is open to a top surface of the heat exchanger core 34. The water spray assembly 40 further includes a water supply 56 to provide water to spray nozzles provided in the enclosure, which will be described in greater detail with reference to FIGS. 5-7.

As discussed above, the drift eliminators 52 define an upper extremity of the enclosure 42 and the end panels 44, 46 and the side panels 48, 50 define vertical surfaces of the enclosure, with the doors 54 enabling access to the other components located in the interior of the enclosure. Each drift eliminator 52 is configured to allow the free passage of air with a minimal of airside pressure drop while enabling the capture of water droplets or mist contained in (or traveling with) the scavenger airstream to prevent this water from escaping the enclosure 42 and being lost from the heat exchanging process. This captured water is collected in the cells of the drift eliminator(s) and combine and form large water droplets that have enough mass to overcome the buoyancy effect of the velocity of the scavenger airstreams to enable the return to the heat exchanging core 34 via gravity.

Figure 5:
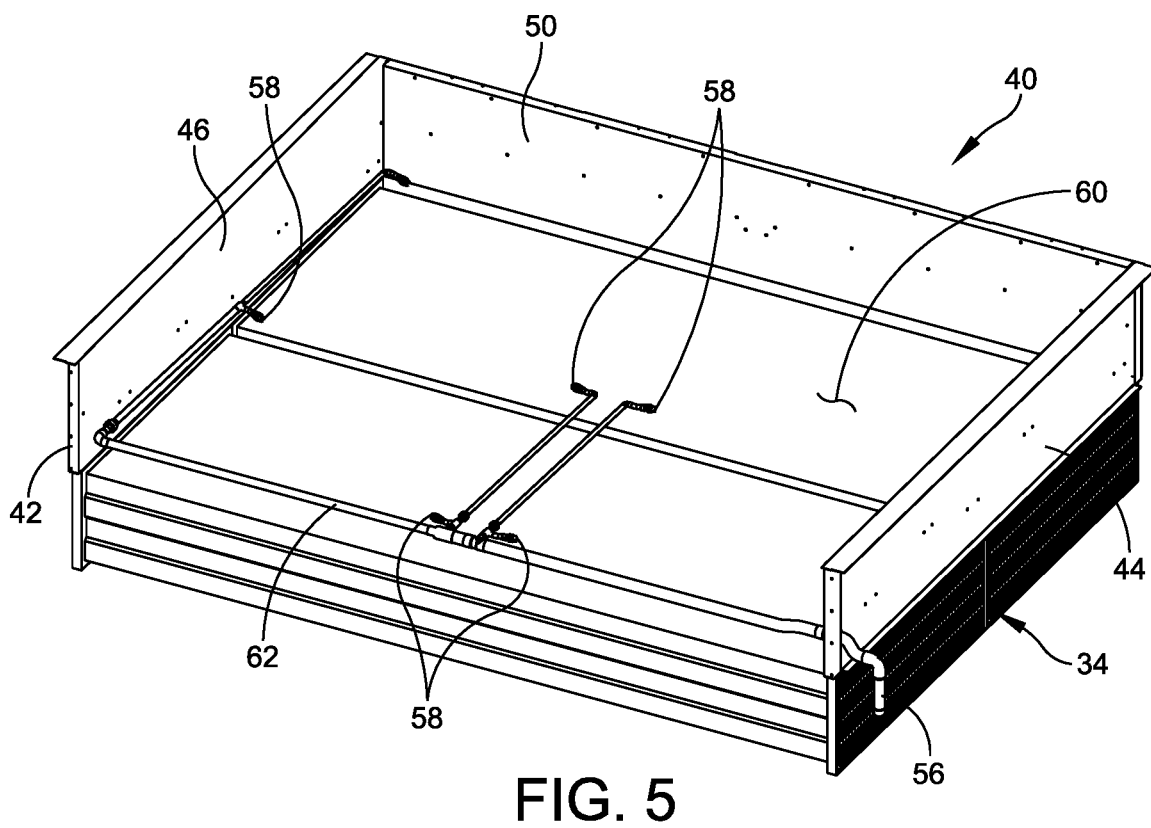
FIG. 5 is a perspective view of the water spray assembly showing spray nozzles of the water spray assembly.
Figure 6:
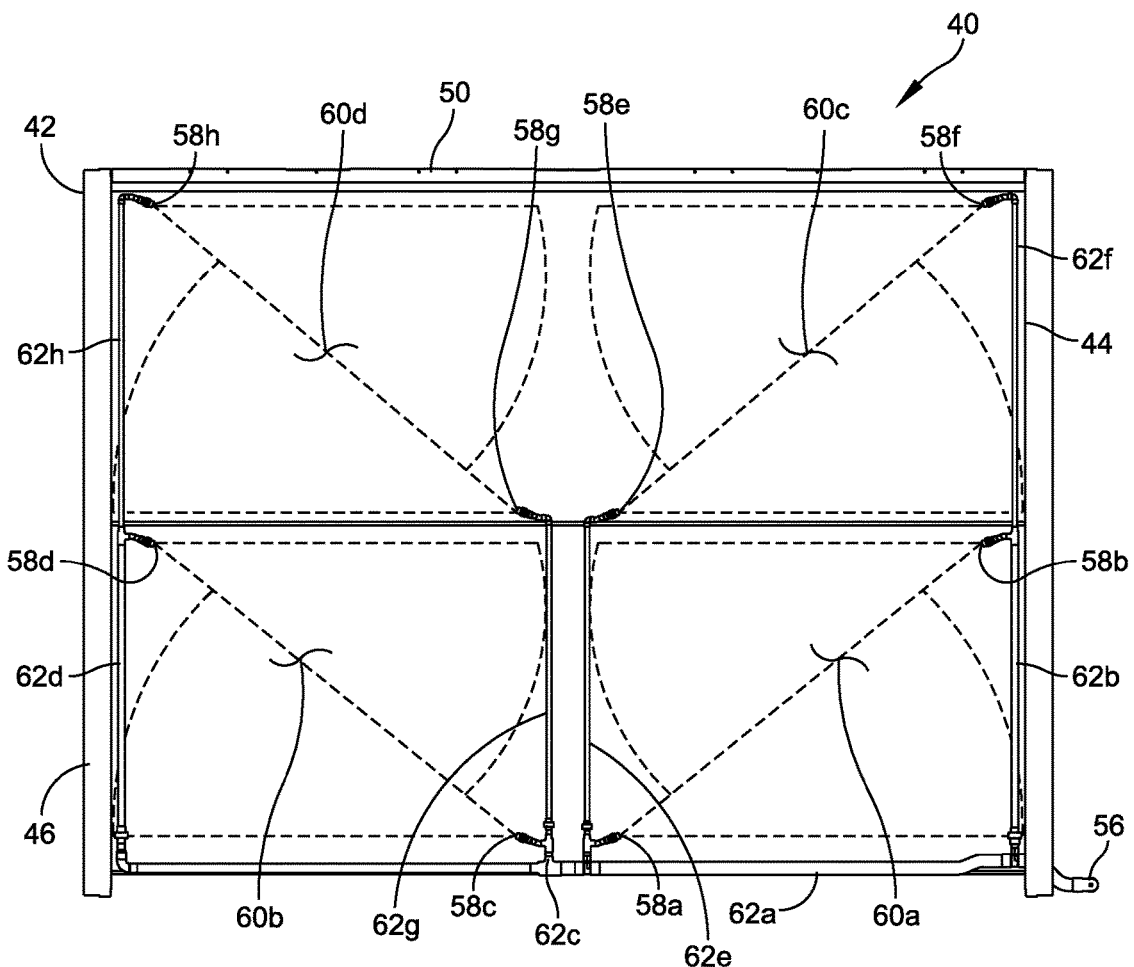
FIG. 6 is a top view of the water spray assembly showing a spray pattern.
Figure 7:
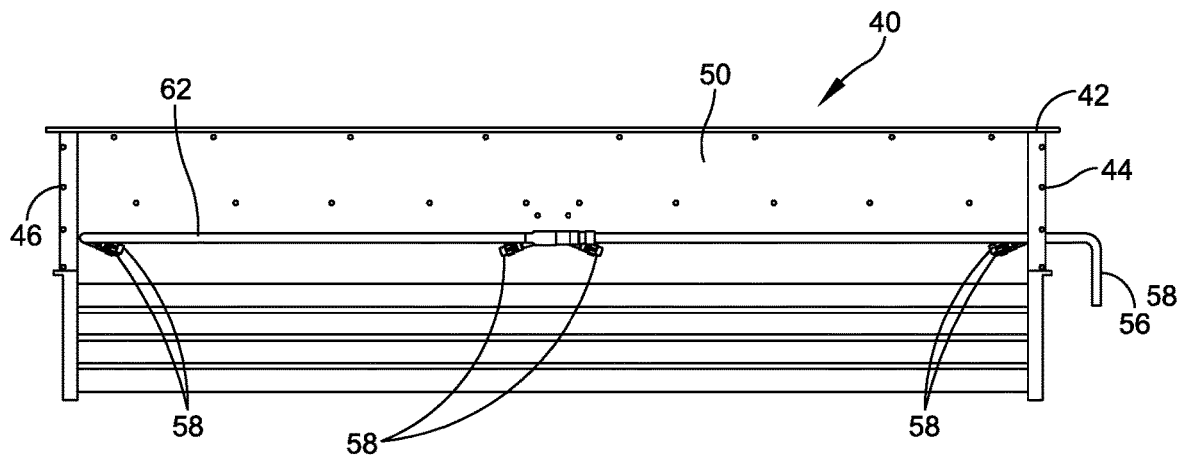
FIG. 7 is a cross sectional view of the water spray assembly.

Referring to FIGS. 5-7, the water spray assembly 40 further includes several spray nozzles, each indicated at 58, to spray water on a top or upper surface of the heat exchanger core 34. Each spray nozzle 58 is connected to a piping section and configured to spray an even distribution of water over a rectangular or square area of the of the heat exchanger core 34. Each spray nozzle 58 is selected and configured to produce a flat, fan-shaped spray pattern of water droplets that is directed in a mostly horizontal manner and that these droplets can be allowed to either fall under the influence of gravity to the heat exchanger core 34 positioned below, or to be conveyed by the air currents of the scavenger airstream to cells of the drift eliminator positioned above, or to function under some combination of these two operation modes. In this manner, the water spray assembly 40 effectively distributes water spray delivered from the spray nozzles 58 to the heat exchanger core 34 positioned below in the most efficient and evenly applied means. Moreover, the assembly 40 and the method of construction and arrangement of components of the assembly described herein and combined with this mostly horizontal spray pattern allow for an extremely compact system which minimizes the overall height required to apply the water in an even fashion to the heat exchanger core 34 below. This even distribution of water to the top surface of the heat exchanger core 34 allows it to maintain an even wetting for all of the heat exchanging surfaces of the heat exchanger core below the top surface of the heat exchanger core, thereby maximizing the evaporative potential of the heat exchanger core and allowing for a more efficient process overall.

In the shown embodiment, the lower horizontal plane of the enclosure 42 is open to the top surface of the heat exchanger core 34. This plane can be divided into any number of areas consisting of multiple rectangular- or square-shaped quadrants. The number of quadrants is a function of the capabilities of the individual spray nozzles 58 and the heat exchange requirements of the heat exchanger core 34. As shown, in one embodiment, a surface 60 created by the upper surface of the heat exchanger core 34 is divided into four quadrants 60a, 60b, 60c, 60d in which each of these quadrants can be defined by a pair of spray nozzles 58. Each quadrant 60a, 60b, 60c, 60d can be subdivided into at least two or more areas. These subdivisions encompass the creation of a series of nested triangles, each having an equal or nearly equal area. While there may be more than two subdivisions for a specific application, the simplest form of subdivision is selecting two opposing corners of the rectangle or square quadrant to create two triangular areas within it. In one embodiment, each of these areas is comprised of a right-triangle and having a common line for the hypotenuse. These areas represent the water spray area for each of the spray nozzles 58 utilized for the quadrant. For example, the placement of a spray nozzle 58 may be located near one point of the triangular area and directed to spray water to the triangular side opposite this point.

In one embodiment, the water spray assembly 40 includes eight spray nozzles 58, which are provided to sufficiently cover the surface 60 defined by the upper surface of the heat exchanger core 34. In one example, a first quadrant 60a of the surface 60 of the enclosure 42 has two spray nozzles 58a, 58b, to provide nearly total coverage on the portion of the surface. A second quadrant 60b of the surface 60 of the enclosure 42 has two spray nozzles 58c, 58d to provide nearly total coverage on that portion of the surface. A third quadrant 60c of the surface 60 of the enclosure 42 has two spray nozzles 58e, 58f to provide nearly total coverage on that portion of the surface. A fourth quadrant 60d of the surface 60 of the enclosure 42 has two spray nozzles 58g, 58h, to provide nearly total coverage on that portion of the surface. For each quadrant, the two spray nozzles, e.g., spray nozzles 58a, 58b provided for quadrant 60a, are positioned on opposite corners of the quadrant to intersect at adjacent edges of spray patterns. As a result, the eight spray nozzles 58 cover nearly the entire surface 60 of the enclosure 42.

As a result, each quadrant contains a group of at least two spray nozzles 58 that produce a fan or V-shape of water spray which will mostly be contained within each of the spray nozzles own triangular patterns, but may minimally overlap the adjacent sides to ensure that water is delivered to all areas of the quadrant. By this manner, the spray nozzle group(s) provide nearly total coverage for the heat exchanging core 34 below them.

Each spray nozzle 58 is fluidly coupled to the water supply 56 by respective piping sections 62a, 62b, 62c, 62d, 62e, 62f, 62g and 62h. Each piping section 62a, 62b, 62c, 62d, 62e, 62f, 62g and 62h is configured to bring water into and transport the water around the interior of the enclosure. In the shown embodiment, the pipe sizing is based on a demand-load methodology. Other embodiments may utilize different methods of piping design or configuration to fluidly connect the spray nozzles 58 to the supply 56.

FIG. 6 additionally illustrates the spray patterns of the spray nozzles 58. In one embodiment, each spray nozzle 58 is configured to produce a flat, fan-shaped spray pattern with spray angles at 30° to 60° at low pressures, e.g., 5-7 psig. For example, each spray nozzle 58 may be a ZLF65100 spray nozzle provided by Bex Incorporated of Ann Arbor, Mich. The result is that each spray nozzle 58 produces a spray pattern to create a V-shaped pattern. In one embodiment, water is ejected from the spray nozzle 58 initially as a sheet of water that spreads as the sheet breaks up into larger droplets. The droplets continue to break into smaller size droplets to cover the area in the V-shaped pattern. Gravity and the initial velocity of the water from the spray nozzle 58 affect how the droplets are dispersed onto the surface 60.

FIG. 7 illustrates the elevational position of the spray nozzles 58 with respect to the surface 60 of the enclosure 42. As shown, the spray nozzles 58 are positioned relatively close to the surface 60, with the spray angled slightly lower than horizontal. In this embodiment, the vertical angle is approximately 5.5 degrees from the horizontal baseline. In one embodiment, each individual spray nozzle can be angled down and adjusted heightwise to enable a bulk of the water ejected from the spray nozzle to be applied to the surface 60 of the heat exchanger core 34. Only a very small amount of fine mist is carried with the air current moving vertically through the heat exchanger core 34. In this regard, a horizontal velocity of droplets sprayed by the spray nozzle 58 is due to the pressure of the fluid in the spray nozzle.

Figure 8:
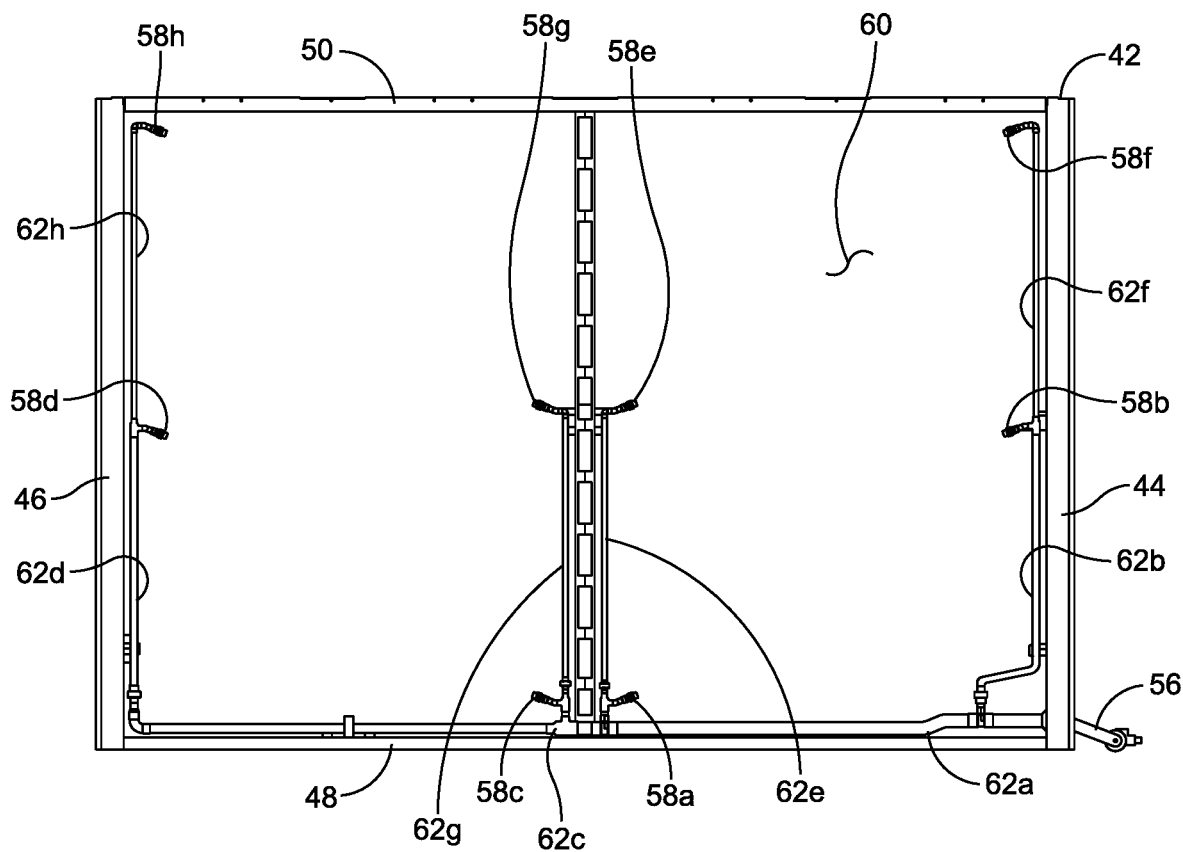
FIG. 8 is a top view of piping of the water spray assembly.

FIG. 8 illustrates a piping schematic of the spray nozzles 58 and the piping sections 62 for the shown embodiment. The piping sections 62 are secured to the end panels 44, 46 and the side panels 48, 50 of the enclosure 42 by brackets and/or clamps, which are secured to the panels by fasteners, such as screw fasteners. The piping sections 62 are fluidly connecting to the water supply 56 to supply water to the spray nozzles 58 during operation.

It should be noted that the spray nozzles 58 described herein to perform the operation of spraying water on the heat exchanger core 34 may be of a standard style, readily available commercially and configured to provide a spray pattern generally described as a "flat spray" but may be otherwise characterized as "flat spray (tapered) nozzles," "flat spray (deflected-type) nozzles," "flat (even) spray nozzles," "flat (V) spray nozzles," "high impact flat spray nozzles", "flooding nozzles" or other similar terminology. Regardless of any specific manufacturer terminology, the spray nozzles can be characterized by their spray pattern, in which the water that is emitted from the spray nozzle is essentially confined to a single directional line of action from the spray nozzle tip when viewed from one orthogonal direction and when viewed from another orthogonal direction spreads out into a triangular shape as the water travels away from the spray nozzle tip. The spray nozzles can be selected for almost any combination of the requisite requirements for inlet water pressure, water flow rate, nozzle pressure drop, water droplet size, orifice size, water spray angle, nozzle wear characteristics, nozzle attachment type or others.

Components of the IEC unit can be selected to allow a minimum of pumping power for the operation of the spray nozzle, to have a targeted water flow-rate that is specific to the design of the heat exchanger core and the number of quadrants, and to have other desirable characteristics, such as fouling-resistance and increased designed life versus other common nozzles designed and sold for the specific purpose of delivering cooling water to the heat exchanger. By utilizing the flat fan nozzles in the unique manner described herein, water spray assembly can apply water in a mostly horizontal spray direction. The water spray assembly of the IEC unit requires a bare minimum of vertical separation between the spray nozzle and the upper surface of the heat exchanger core, and allows for a very even dispersion of the water droplets produced by the spray nozzles over the surface area of the quadrant when the scavenger airflow is either off or when operated with mild air velocities of up to approximately 100 feet per minute. Further, it can be demonstrated that in order to accommodate higher air velocities while maintaining a similar even dispersion of water droplets, the spray nozzles can be arranged in a manner such that there is a slightly increased height of separation between the spray nozzles and the upper surface of the heat exchanger core plus the addition of a slight downward tilt to the direction of the nozzle spray. This new arrangement will allow for the bulk of the droplets of the nozzle spray to be applied evenly.

It should be observed that the water spray assembly 40 of embodiments of the present disclosure and the associated method of spraying water on the heat exchanger core 34 provide a very even distribution of water on the top surface of the heat exchanger core. By evenly applying the water to the top surface, an even distribution of water to all of the heat exchanging surfaces within the heat exchanger core 34 is achieved. This allows the heat exchanger core 34 to operate in a more efficient manner and at its peak capacity when utilizing the evaporative mode of cooling. The water spray assembly 40 and the associated method of spraying water on the heat exchanger core 34 require no controls or algorithm to operate.

The water spray assembly 40 and the associated method of spraying water on the heat exchanger core 34 described herein is easily repeatable and readily configurable for use on other heat exchangers designed for the purposes of air-to-air or evaporative cooling of a process airstream. As the heat exchanger is of a type designed for this process, the assembly and the method of water spray described here are not limited by the size or capacity or type of heat exchanger. The system and method do not rely upon the exact components utilized for the application shown in that similar components are available for use in order to adapt the design here to any similar heat exchanger.

The water spray assembly 40 is compact in design. Specifically, the assembly 40 requires a minimum of vertical space to evenly disperse the water to the heat exchanger. When compared to other water spray assemblies, the assembly 40 of the present disclosure is more compact in design, and less expensive to implement.

Water Collection and Management System

Referring to FIG. 2, the IEC unit 22 further includes a water collection and management system, generally indicated at 80, disposed within the base frame section 26 of the frame assembly 24. As will be described in greater detail below, the water collection and management system 80 is configured to collect water that is sprayed by the water spray assembly 40 onto the heat exchanger core 34 located above the water collection and management system within the IEC unit 22. The water collection and management system 80 also may be provided to collect and manage condensation that drops from the heat exchanger core 34 and other supplemental heat exchangers during operation. In reference to FIG. 9, a certain embodiment of the water collection and management system 80 includes a water basin or drain pan 82 that acts as a main reservoir of water for the operation of the water collection and management system. The water basin 82 may be sized and shaped or subdivided as required to suit the form factor of the particular IEC unit 22 in which the water collection and management system 80 is installed. In one embodiment, the water basin 82 is fabricated by welding panels of stainless steel. However, any suitable materials or construction methods may be utilized for the purposes of retaining the water within the reservoir.

Figure 9:
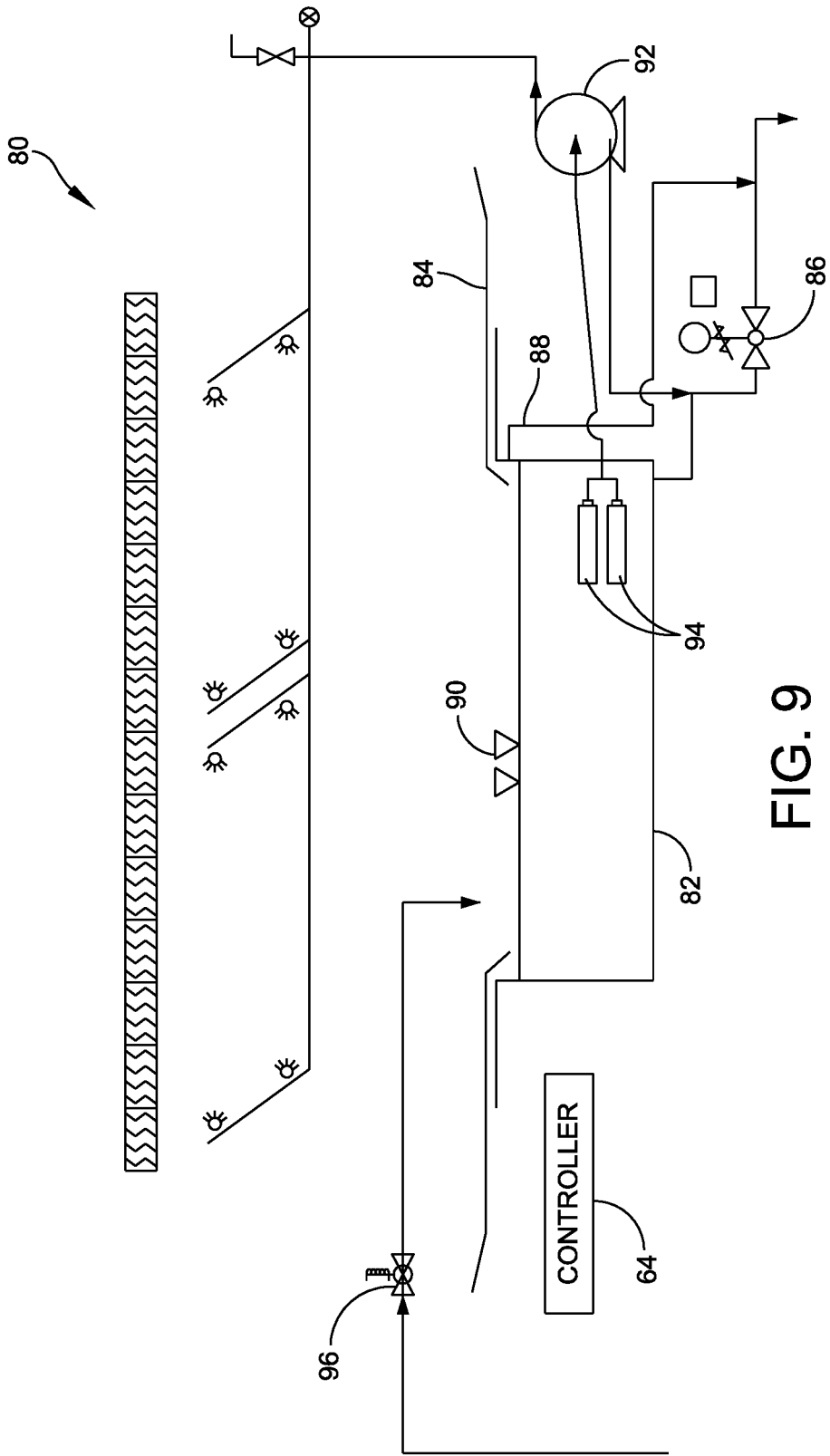
FIG. 9 is a schematic view of a cooling system of the indirect evaporative cooling unit.

As shown in FIG. 9, the water collection and management system 80 includes the water basin 82 configured to contain fluid, such as water. A basin catch 84 surrounds the water basin 82 to capture water discharged from the water spray assembly 40 onto the heat exchanger core 34 and direct the water to the water basin. The water basin 82 is in fluid communication with a basin drain valve 86 to control the amount of water within the system 80. The water collection and management system 80 further includes an overflow 88 to protect against too much water within the water basin 82. When too much water is in the water basin 82, the drain valve 86 may be opened to let water out of the water basin. Water level and conductivity sensors 90 are provided to monitor the water level and the conductivity of water within the water basin 82, and can be coupled to the controller 64, along with the drain valve 86, to control the amount of water in the water basin.

As shown, the water collection and management system 80 further includes at least one pump 92 to force water back to the water spray assembly 40. In one embodiment, the pump 92 is fluidly connected to the water basin by one or more basin strainers 94 to filter contaminants from the water prior to moving the water to the pump. While the water collection and management system 80 is a quasi-closed system in which water sprayed by the water spray assemblies 40 is collected by the water collection and management system and recovered for reuse, new water needs to be added to the system from time-to-time. In the shown embodiment, the water collection and management system 80 further includes a water supply having a water fill valve 96 to supply water to the water basin 82 when the water basin is low. As with the water level and conductivity sensors 90 and the drain valve 86, the pump 92 and the water fill valve 96 can be coupled to the controller 64 to control the amount of water being delivered to the water basin 82 by the water supply. In other embodiments, the fill valve 96 may act in accordance with a mechanical controller, for example, a float actuated switch, and the controller 64 may utilize the drain valve 86 to control the basin water level and operational timing of the water fill valve 96 via these means.

In certain embodiments, there are two instances in which the water fill valve 96 of the water collection and management system 80 should operate. In one instance, the water fill valve 96 operates when commanded open by a customer in a maintenance mode or by a remote command. This command can be automated to fully fill the water basin 82, or be manual to partially or fully fill the water basin. In another instance, the water fill valve 96 operates to fill the water basin 82 as part of an automated process.

In the maintenance mode, a technician is able to command the fill valve 96 open on demand. In the event the fill valve 96 is commanded open, the controller monitors the water basin level sensor 90 and automatically shuts the fill valve once a maximum fill or "max fill" condition is reached or if the technician commands the fill valve 96 closed at some time prior to this automated stop point. During this period of automated monitoring, the controller 64 will prevent any actuation of the drain valve 86 until such time as the fill cycle is completed. That is, the basin water level sensor 90 registers a reading to indicate that the water reservoir is full and meets the max fill requirement. (For the systems and methods described here, the operation of the fill valve 96 is assumed to be digital (on/off) in its nature. That is to say, it is only either open or closed.)

In general, the water fill process can begin whenever a water level in the water basin 82 is reduced to the point such that it achieves the customer's set point as determined by a water reserve setting provided. Once the fill cycle starts, it can continue until it reaches the maximum fill level as determined by the water level sensor(s) 90. Additionally, while the system 80 is in a fill cycle, the system can be configured to prohibit drain or blowdown actions to start. Any in-process action can be allowed to first finish if necessary.

In the event the water level sensor 90 does not detect a rise of water level in the water basin 82 during a fill cycle, the system 80 can be configured to assume that the water supply is not available and can leave the fill valve in the open position so that water can be utilized for operation at the first possible moment.

In the event the water level sensor 90 is reading incorrectly, and indicating a lower reading than the actual water level, it may be possible that the water level never reaches the maximum fill position to complete the fill cycle. In this event, the system 80 can first assume that the failure is due to a loss of a fill supply system. However, if the supply is present and the error is truly due to the sensor itself, either caused by a simple calibration error or other error in its operation, the system 80 can be able to detect that condition. (In one embodiment, an average water consumption of the system is approximately 2 gallons per minute ("gpm") and a recommended fill requirement is approximately 25 gpm, with a minimum of 10 gpm.) Therefore, the water level can reach the overflow condition and achieve essentially a constant water level. Once the system 80 determines that the water level is remaining constant, the system can be configured to: 1) update the user notification appropriately, 2) re-calibrate the water level sensor 90 to indicate that the water level is at overflow height, and 3) close the fill valve 96 and end the fill cycle. Once complete with these actions, the controller can determine if the assumed cause was in fact correct. Since the fill valve is closed, it should register a slow decrease in the level of the water basin 82 due to the 2 gpm consumption. If this is true, then the system can return to normal operation. If not a true condition, the system may enter a protection mode (as will be described in greater detail below) and re-activate the fill valve 96 in order to preserve the cooling operation and re-issue the error notification to the user or system monitor.

Further, in the event the water level sensor(s) in the water basin 82 registers substantially higher water level reading than the known height or level of the overflow pipes positioned within the water basin 82, the system 80 can be configured to assume that the overflow pipe 88 has a blockage and to utilize a main drain valve 86 to remove water from the system.

There are two instances in which the water pump 92 can be started. In a first instance, the water pump 92 can be started if commanded to by the customer in a maintenance mode, which also requires the water level set point for starting the pump being verified with the level sensor 90 or by a remote command. In another instance, the water pump 92 can be started if commanded to go into wet mode from another operational mode during the course of the automated operation of the system 80 under the command of the controller 64.

The water level required in the water basin 82 can be configurable in the system 80, and have a minimum and maximum allowable setting. The minimum allowable setting is based on the physical constraints of the system 80, for the current design this minimum level is defined as 2.5 inches (63.5 millimeters ("mm")) above a suction inlet of the pump 92. This is equivalent to a water level height ("hw") of 12.7 inches (313.7 mm) in the water basin 82. In other embodiments, the water level required in the reservoir need only be sufficiently located as to ensure that the operation of the pump(s) 92 is not hindered in any manner. This function is determined specifically by the requirements of the pump(s) 92, the configuration of the water basin 80, and the method of fluid connection.

The maximum allowable setting is also based on the physical constraints of the system 80. For the disclosed configuration, the maximum allowable setting is defined as 12 mm less than the maximum fill level of the water basin 82. This is equivalent to a water level height ("hw" or "hwater") of 14.35 inches (364.5 mm) in the water basin 82.

In one embodiment, a default value of the water level height (hw) of the water basin 82 that is programmed into the controller 64 can be 13.6 inches (345.1 mm).

During a starting operation of the pump 92, when the system 80 requests the pump to start, it should not allow a blowdown cycle to operate until after the pump has started and the first fill cycle has been completed. (E.g., the water level of the water basin 82 has achieved maximum fill setting at least once and a water pressure switch has been activated and indicates that the system is operating normally.) In this disclosure, a "blowdown" cycle is used to indicate a condition in which the water or fluid contained within the system 80 has a higher than desired concentration when monitored by the conductivity sensor(s) 90 and compared to the set point specified by the customer for this condition. In the normal operation of this and similar equipment, when this condition is true, the system 80 should act to remove the highly concentrated water or fluid from the system utilizing the drain valve 86 and replace it with fresh water from the source via the fill valve 96. Further, it can be demonstrated that the simultaneous action of both devices, i.e., the drain valve 86 and the fill valve 96, can force a system such as this to consume more water than is absolutely required to support the systems operation as it may dilute the concentration of the water being expelled to the drain. Lastly, and as is typical of many commercially available conductivity sensors, these types of sensors are generally more accurate in their measurements when the water or fluid being measured is flowing over, around or through the sensors measurement means. As presented above, the controller 64 of the system 80 will ignore the measurements of the conductivity sensor(s) 90 until such time as the operation of the pump(s) 92 can be verified via a water pressure switch or other means, thus proving that the water is flowing over the conductivity sensor(s) 90 and that its measurements should be considered accurate enough for use.

For the system described herein, in one embodiment, the drain valve 86 can be a motorized valve able to be commanded and controlled in its actuation to any position from fully closed to fully open. The drain valve 86 further can include features to define it as being of the normally closed type or having a means to force it to its normal position under the loss of electrical power with the incorporation of a spring or other means. There are at least four instances in which the drain valve 86 should operate. In a first instance, the drain valve 86 can be commanded open by the customer in a maintenance mode or by remote command. In this instance, the command may fully drain the water basin 82 by moving the valve to 100% open or may specify a specific open position. In a second instance, the drain valve 86 can be automatically commanded via the controller 64 to initiate a full system drain. For example, for freeze protection or some other automated process, a full system drain can be initiated. In a third instance, the drain valve 86 can be automatically commanded to initiate a blowdown of the water collection and management system 80. In a fourth instance, the drain valve 86 can be automatically commanded to open when a high-water-level failure mode is experienced.

If a full system drain is required by an automated process or maintenance command, the drain valve 86 can be opened to the full-open position (90 degrees open). Additionally, there may be a time delay before the drain valve 86 can be commanded closed again. This delay may be long enough to ensure that the water collection and management system 80 is fully drained after the level sensor has stopped registering water in the system, e.g., five minutes.

The water collection and management system 80 can be configured to enter a blowdown state after the following conditions are inspected. A conductivity reading is conducted by the conductivity sensor 90 to attain the same value as the customer's provided blowdown set point. This can be an instantaneous reading and need not be a time averaged value. Breaking this threshold can begin the process to determine the proper course of action. Once this condition has triggered, the controller 64 can determine the current water level via the water level sensor 90—if the current water level is lower than the drain valve threshold, then the controller can skip the drain valve actuation and proceed directly with a water fill cycle. For a system that has been properly set-up (programmed) by the customer, this fill water should be sufficient to dilute the basin water to below the blowdown threshold set point. Additionally, this can allow the water collection and management system 80 to operate closer to the desired set point for a longer period of time.

If instead the current water level is above the drain valve threshold, the water collection and management system 80 can enter a blowdown state by actuating the drain valve to remove the water with a higher concentration of dissolved minerals from the system prior to filling the water basin with fresh water. This condition can reduce the total consumption of water by the water collection and management system 80. The drain valve threshold is further addressed below but for the purposes of immediate understanding, this value is determined by the actual configuration of the system and components used to comprise system 80. It represents a system protection to guarantee the pump 90 can continue its operation. If the system actuated the drain valve below this threshold, it may not be able to close the drain valve in a manner that is fast enough, thus allowing more water to leave the basin then desired and possibly allowing the pump to ingest air—which of course would force the pump to lose its prime and cavitate.

When conducting a blowdown, the rate of draining is controlled and only the water contained within the operational volume (defined further below) can be drained. The water contained within the water basin 82 and designated as a "reserve volume" cannot be considered a part of an "operational volume." The drain valve 86 is commanded to an open position that could be equal to but is normally less than 100% open and can be closed so that the total volume of fluid removed from the water basin hits a targeted value.

The blowdown action may not be allowed to occur while the water collection and management system 80 is in a fill cycle. The blowdown and fill actions are to be considered separate from one another; however, the completion of a draining action can remove just enough water from the water collection and management system 80 so that the current water level is below the fill threshold setting, thus activating the water fill system.

Figure 10:
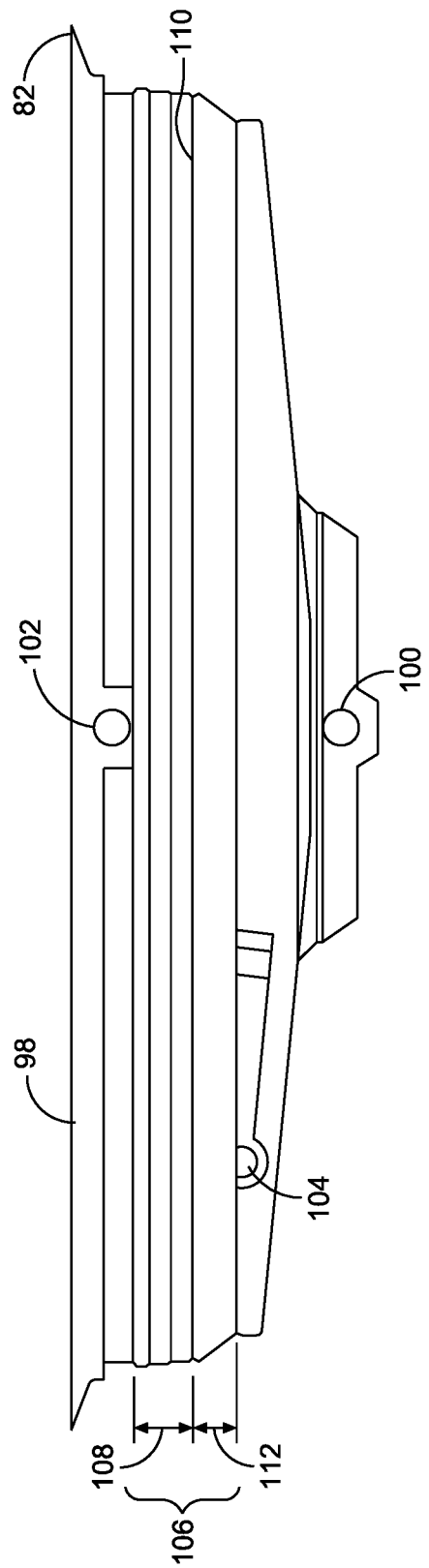
FIG. 10 is a side view of a water basin and operational zones of the water basin.

Referring to FIG. 10, the method of performing this function is described below. As shown, the water basin 82 includes a housing 98 configured to contain water. The housing 98 includes a drain port 100, an overflow port 102, and a pump suction port 104.

Definitions

Total Usable Water Volume=Water Reserve Volume+Operational Volume=106.6 gal. (Other embodiments may have different volume values.)

Total Usable Water Volume is defined as all water that could be used by the equipment to continue its operation under a failure of the water supply system. Or stated differently, Total Usable Water Volume is the volume of water contained within the water basin that is above the water intake pipe of the pump at its inlet point (air ingestion point). The Total Usable Water Volume is indicated at 106 in FIG. 10.

Operational Volume is defined as the volume of water utilized for normal operation, e.g., no failure modes present. The Operational Volume is a subset of the total usable volume and exists above the Water Reserve Volume. The Operational Volume is a variable quantity and is dependent upon the customer's set point of the reserve water time ("RT"). The Operational Volume is indicated at 108 in FIG. 10.

Drain Valve Threshold ("DT") is defined as a water height set point that is based on the customer's desired reserve volume, and, in the shown and described embodiment, is equivalent to a water volume that represents the lower 24 gallons of the operational volume. The main purpose of the DT setting is to prevent the water collection and management system 80 from attempting to drain small volumes of water with a large (e.g., 2-inch dia.) drain valve 86, the Drain Threshold adds a layer of protection to the assumptions used to develop the below-described algorithm. The Drain Valve Threshold is indicated at 110 in FIG. 10.

Water Reserve Volume is defined as the amount of water remaining in the water basin 82 and is the difference between the Total Usable Water Volume 106 and the Operational Volume. The Water Reserve Volume is indicated at 112 in FIG. 10.

It should also be noted from the embodiment in FIG. 10 that other water may exist within the system 80 or housing 98—this water, as shown, is not "usable" by the pump but is still useful to the system. Other embodiments may relocate the pumps intake port or otherwise reconfigure the shape of housing 98 to bring this volume into Total Usable Water Volume.

In the event the customer sets the RT to a relatively small value, one that could put the lower bound of the Operational Volume below a minimum refill start level (as defined by the customer), then the value of DT should be applied to the minimum refill start level instead of the lower boundary level of the Operational Volume.

The value of the DT offset should be calculated every time the water reserve time (RT) is reset by the customer.

Given that the volume of any housing 98 is a known function of its shape and configuration, and that this volume can either be theoretically or empirically determined from the measured height of the water it contains, this knowledge used in conjunction with information on the performance of a specific drain valve 86 with its fluid connection to basin 82 will allow the system controller 64 to be configured in a manner so that it may respect and utilize the boundaries described above.

Once this volume of water and the operation of the valve can be described mathematically, then the timing of when to start closing the valve can be computed so that the total volume of water drained can be a specific desired amount.

For the purposes of simplicity, the equations described above can be integrated into a lookup table for use by the controller 64 and the appropriate Drain Valve Threshold (DT) applied.

In one embodiment, the bin sizes utilized in the water basins lookup table should be set to increasing sizes, each 5 gpm larger than the last. These values can be multiplied by the desired time to complete the draining operation, or specifically for this embodiment, a time of 3 minutes. The midpoint of any particular bin should be used as the operational point. From this, it can be recognized that 1) each of the bins represent a different amount of water to be drained, and 2) that each of the bins have a unique value for the open position of the drain valve 86 such that as increasing volumes of water are desired to be drained, the valve open position for that volume will be larger as well. One of the purposes of using multiple operational points for the drain valve 86 is an attempt to mitigate a physical failure of the seals of the drain valve 86 over many thousands of actuations. It is an undesirable condition for the drain valve 86 to open to exactly the same spot in this scenario. In another embodiment, a feedback control for the timing of the drain valve 86 can be applied within controller 64 from the measurements of the water level sensor 90, allowing the timing of the drain valves 86 operation to be based on the dynamics of the system in real time.

In the event a fluid level of the water basin 82 registers substantially higher than the overflow level, the water collection and management system 80 can be configured to assume that the overflow pipe has a blockage and utilize the main drain valve 86 to remove water from the system. For this action to occur, in the shown embodiment, the water level must exceed 224.3 gallons (d=12.6 inches, hw=17.4 inches†). Once this condition occurs, the drain valve 86 can be commanded to an open position of 50 degrees‡ (drain rate of approximately 10 gpm). And it can be commanded to begin closing once the water level drops below a volume of 186.6 gallons (d=10.6 inches, h=15.4 inches†).

† Note: d=level sensor measured depth and h=actual water height.

‡ 50 degrees open is equivalent to: 50/90*100=55.55% open.

In the event after a blowdown and fill cycle have been completed, and the conductivity reading of the sensor is still above the threshold (e.g., a customer's set point), it should repeat the blowdown and fill cycle one more time.

If after this second action cycle the conductivity reading is still above the threshold—it should provide an alarm to the system monitor/user that the equipment conductivity reading is out of calibration or needs maintenance.

In one embodiment, the water collection and management system 80 continues to drain and refill the system for a total of five times in an attempt to reduce the conductivity of the reading. If after the fifth refill the reading still has not dropped below a set point threshold, the water collection and management system 80 can be configured to suspend the use of the blowdown cycle and enter an emergency blowdown mode. For this mode and this embodiment, the drain valve 86 shall be opened to 32 degrees open (or a drain rate of approximately 2 gpm) and held at this condition until the alarm is reset. While in this emergency blowdown mode, the fill operation can operate as it normally would—cycling on and off from the low to high set points. It should also be noted that this drain rate is equivalent to the nominal evaporation rate of the equipment in use. Choosing this value enables the equipment to continue its operation and provide cooling for critical infrastructures while also ensuring that the water in the system does not become excessively concentrated with dissolved solids at the expense of a higher than normal water consumption.

During this mode of operation and in the event the system 80 triggers an alarm or alarms to indicate a loss of water supply, the drain valve 86 can be commanded shut until the alarm is reset thereby further allowing the cooling operation of the equipment to continue for the longest possible time.

In one embodiment, an actuator of the drain valve 86 contains a feedback sensor designed to report the actual valve position. In the event this control does not indicate that the valve 86 is closed after an appropriate closing time has elapsed, or if the control recognizes that the feedback signal is not changing appropriately during the valve closing time, then the water collection and management system 80 assumes that an item (debris) has become caught in the ball valve and should take the following corrective actions.

In a certain embodiment, the water collection and management system 80 is configured to inspect/understand the valves angular position at any "stuck" position. From this position, the controller can make three (3) attempts to clear the debris by opening the valve in five degree increments per attempt. Stated another way, the valve can open five degrees from the stuck position on the first attempt, ten degrees from the stuck position on the second attempt and 15 degrees from the stuck position on the third attempt. After each opening, the valve should attempt to close and only make the next attempt after proving that the valve cannot fully close. While this operation is occurring, the fill cycle can be allowed to operate.

It should be noted that a normally constructed ball valve is effectively closed at a position slightly greater than zero degrees open. While dependent upon the exact manufacture, for many ball valves, if the valve is less than eight degrees from full closed, the valve is effectively shut.

If after the third attempt, the valve fails to fully close, then the water collection and management system 80 can be configured to go into a protection mode in an attempt to preserve the water in the water basin. For this embodiment, the water collection and management system 80 shall do this in a similar manner as described above and attempt to drive the valve to an open position of 32 degrees for a controlled drain rate. (It shall be considered acceptable for these common fallback conditions to be the same state machine or control method.) The aforementioned debris control action(s) can be overridden by a blowdown system control.

The function of the water level sensor 90 is important for the successful operation of the water collection and management system 80, and represents a unique failure point that can affect almost every decision of the controller 64 of the water collection and management system. In one embodiment, an additional water level sensor can be provided as an optional to be utilized as a redundant sensor to the water collection and management system 80.

In one embodiment, trigger points of the fill system operation are high and low water levels that are determined from the water level sensor. In the event of a level sensor failure, the water collection and management system 80 can use a timer to control the system. Immediately following the loss of signal, the water collection and management system 80 can attempt to protect itself by filling the water basin 82. In a certain embodiment, this initial water fill cycle can assume that the fill system is operating at the minimum allowable fill rate of 10 gpm, and that the water basin 82 is empty. In this embodiment, the fill valve 96 can be opened and allowed to operate for 17.5 minutes. In another embodiment, since a pump pressure switch exists and provides a good way of determining that the pump(s) 92 is operational, if desired, this could be used to modify the timing of the initial fill cycle from the value above to 8.6 minutes since a minimum volume of water is necessary for the operation of the pump.

After the initial fill cycle has been completed, and assuming that all other systems and components are operating normally, the water collection and management system 80 can be configured to implement the fill cycle in a regular fashion and interval until the alarm can be reset. One assumption of this operation can be that the water collection and management system 80 is consuming 2 gpm for its operation and additionally that the drain valve 86 is set to the emergency blowdown condition and draining an additional 2 gpm from the water basin 82. Therefore, after a ten-minute time delay, for example, the fill valve 96 can be opened for 6.67 minutes and continue in this cycle of 10/6.67 minute timing schedule until the alarm is reset.

Further, in the event of a water level sensor 90 failure, the water collection and management system 80 can be configured to protect the water currently held in the water basin 82. Essentially, in order to accomplish this configuration, the water collection and management system 80 disables the ability of the blowdown control to open the drain valve 86 as it would normally. The blowdown control should instead immediately transition into the fixed slow drain position discussed above, e.g., by moving the valve to 32 degrees open≈2 gpm drain rate.

If, in the event the water collection and management system 80 is already in a blowdown condition when the level sensor 90 failure occurs, the water collection and management system 80 can be configured to allow the blowdown to finish and force the fill action to occur immediately after. In the event of a water level sensor 90 failure while the water collection and management system 80 is in the overflow state discussed above, the drain valve 86 can be configured to immediately begin closing and the system resort to the slow drain position previously discussed. In the event of a water level sensor 90 failure while the control system (e.g., controller 64) is in the middle of the debris control state discussed above, the drain valve 86 can be configured to discontinue its current action and be commanded to the slow-drain position discussed above.

The following is applicable for the water collection and management system 80 set by the customer to operate in "water-saver" mode and will apply if during the course of automatic operation the unit transitions from the evaporative cooling mode to the dry, air-to-air cooling mode. In this situation, if the water in the basin is lower than the customer's concentration set point (blowdown set point): 1) the water currently held within the water basin 82 should stay in water basin and not be drained, and 2) at the time of transition from wet (evaporative) to dry (air-to-air) operation, record a last known, good reading of the concentration measurement while the pump(s) 92 is or was running. It should additionally compute the water basin volume from last water-level reading after the other system water has drained back to the water basin, e.g., approximately 15 seconds after pump shutdown.

It should be noted at this point, that the physics concerning the evaporation of water from any reservoir, exposed to an open or quasi-open environment being relatively well known—the water held within the water basin 82 will experience this phenomenon. Further, the effects of any air currents over the surface of the water in the reservoir will exaggerate this effect. While the equipment is in the dry mode of operation with the water-saver option engaged, the water collection and management system 80 should poll the water level at least once every 30 minutes and the new concentration of dissolved solids in the water basin should be calculated. The water conductivity sensor 90 will not be required for this calculation and if used may provide an erroneous indication due to the rational stated previously. However, since the last, known accurate reading was recorded and the knowledge that while the volume of water contained within the water basin is changing, the total mass of dissolved solids within the water is a constant. Therefore, given the new water volume, the concentration of dissolved solids within this volume can be computed.

This water that was provided to the equipment, being a resource that is typically purchased by a customer can be conserved within the water basin 82 and the controller 64 may be utilized to make an automated decision as to if this water is still valuable for use. In one embodiment, this decision can be made based upon: 1) the provided set point from the customer for the blowdown control; 2) the quality of the water provided from the source via the fill valve 96; 3) knowledge of the current volume and water quality of the water basin 82; and 4) the maximum volume of water allowed within the water basin. With these conditions, it is possible to compute what the concentration of a full water basin 82 would be if the currently empty volume of the water basin were filled with the fresh supply water from the fill valve 96. Further, this concentration of the then full water basin 82 can be compared to the concentration set point prior to this action to determine if this volume of water would meet or exceed the requirement provided to the controller 64. For one embodiment, it can be determined that if the current volume of water cannot be diluted to the desired concentration as determined by the customer with a single fill action, then the water within the water basin 82 is no longer economical for use and may be disposed of by expelling it to the drain. In another embodiment, this determination can be some percentage value of the provided concentration set point by the customer. For example, the high level set point may be 95% of the blowdown concentration level. This value, for the embodiment shown, guarantees that if the equipment performed the actions described above then it could continue its operation in the evaporative mode without immediately requiring a blowdown to occur.

As a continuation on the discussion of the computations, it can also be demonstrated that given this information at the beginning of the transition process from wet mode to dry mode, the determination of the high level set point can be made at this time and then converted into a critical water volume, one such that if the waters height would be reduced to a state lower than the height of this critical volume it should be drained. Further, as this state of operation is different from the normal wet mode of operation, a different sub-routine may be required within the programming of controller 64, however so long as the following conditions are true then controller 64 will operate properly in this mode:

(1) The normal wet mode blowdown and fill routines are suspended during this mode.

(2) If during this process the water level sensor can no longer measure the water level of the retained water, (e.g., the water has evaporated to the point that the actual water level is below the measurement plane) then the drain valve shall be commanded to the full open position to allow any remaining water drained.

(3) Additionally, a timer can be incorporated into the management method. If the basin water has been reserved (without use) in the water basin for longer than the customer desired duration, then the water basin shall be drained. This allowance being specific to the customer's application, treatment and use of water resource can be utilized to control the advancement of any biological growth within the water basin.

(4) Additionally, the water should be drained if the ambient temperature drops below the set point temperature for more than 60 seconds (freeze protection).

Having thus described several aspects of at least one embodiment of this disclosure, it is to be appreciated various alterations, modifications, and improvements can readily occur to those skilled in the art. Such alterations, modifications, and improvements are intended to be part of this disclosure, and are intended to be within the spirit and scope of the disclosure. Accordingly, the foregoing description and drawings are by way of example only.

The invention claimed is:

1. An indirect evaporative cooling system comprising:
a frame;
a heat exchanger core disposed within the frame;
a supply fan supported by the frame to move indoor return air inside the heat exchanger core;
an exhaust fan supported by the frame to move air over the heat exchanger core in a direction substantially perpendicular to the indoor return air;
a water collection and management system disposed within the frame below the heat exchanger core to collect water sprayed onto the heat exchanger core; and
a water spray system positioned above the heat exchanger core to supply water that is evenly distributed to a top surface of the heat exchanger core, the water spray system including at least one water spray assembly including
an enclosure, and
at least two spray nozzles coupled to the enclosure and configured to spray water on a portion of the top surface of the heat exchanger core, each spray nozzle being coupled to a water source and configured to produce a flat, fan-shaped spray pattern,
wherein a first spray nozzle is directed to spray a majority of a first water only to a first triangular area, a second spray nozzle is directed to spray a majority of a second water only to a second triangular area, and the first triangular area is adjacent to the second triangular area.

2. The system of claim 1, wherein the enclosure includes two end walls, two side walls, and at least one drift eliminator that defines an upper extremity of the enclosure.

3. The system of claim 2, wherein the at least one drift eliminator is configured to capture water droplets and to prevent water from escaping the enclosure.

4. The system of claim 2, wherein the top surface is divided into a plurality of quadrants, and wherein, for each quadrant, the at least two spray nozzles spray over a substantially full area of each quadrant.

5. The system of claim 1, wherein at least two spray nozzles are fluidly coupled to the water supply by a piping section to deliver water into and transport water around an interior of the enclosure.

6. The system of claim 1, wherein at least two spray nozzles produce V-shaped spray patterns.

7. The system of claim 1, wherein at least two spray nozzles are configured to produce spray patterns with spray angles at about 30° to about 60° at low pressures.

8. The system of claim 1, wherein at least two spray nozzles are about 5.5 degrees from the horizontal plane.

9. A method of cooling IT air with an indirect evaporative cooling system, the method comprising:
supplying indoor return air to a heat exchanger core;
moving air over the heat exchanger core in a direction substantially perpendicular to the indoor return air;
spraying water over the heat exchanger core; and
collecting water sprayed onto the heat exchanger core,
wherein spraying water over the heat exchanger core includes spraying water on a top surface of the heat exchanger core with at least two spray nozzles configured to spray water on a portion of the top surface of the heat exchanger core, each spray nozzle being coupled to a water source and configured to produce a flat, fan-shaped spray pattern,
wherein a first spray nozzle is directed to spray a majority of a first water only to a first triangular area, a second spray nozzle is directed to spray a majority of a second water only to a second triangular area, and the first triangular area is adjacent to the second triangular area.

10. The method of claim 9, wherein an enclosure includes two end walls, two side walls, and at least one drift eliminator that defines an upper extremity of the enclosure.

11. The method of claim 10, wherein the at least one drift eliminator is configured to capture water droplets and to prevent water from escaping the enclosure.

12. The method of claim 10, wherein the top surface is divided into a plurality of quadrants, and wherein, for each quadrant, the at least two spray nozzles includes two spray nozzles spray over a substantially full area of each quadrant.

13. The method of claim 9, wherein at least two spray nozzles are fluidly coupled to a water supply by a piping section.

14. The method of claim 9, further comprising controlling at least two spray nozzles with a controller.

15. The method of claim 9, wherein at least two spray nozzles are configured to produce spray patterns with spray angles at about 30° to about 60° at low pressures.

16. The method of claim 9, wherein at least two spray nozzles are about 5.5 degrees from the horizontal plane.

* * * * *